United States Patent
Ryu et al.

(10) Patent No.: US 11,310,851 B2
(45) Date of Patent: Apr. 19, 2022

(54) GNB COORDINATED DEVICE TO DEVICE COMMUNICATION

(71) Applicant: QUALCOMM Incorporated, San Diego, CA (US)

(72) Inventors: Jung Ho Ryu, Fort Lee, NJ (US); Tao Luo, San Diego, CA (US); Tianyang Bai, Bridgewater, NJ (US); Kiran Venugopal, Raritan, NJ (US); Junyi Li, Chester, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/829,537

(22) Filed: Mar. 25, 2020

(65) Prior Publication Data
US 2020/0344828 A1    Oct. 29, 2020

Related U.S. Application Data (60) Provisional application No. 62/837,472, filed on Apr. 23, 2019.

(51) Int. Cl.
| | |
|---|---|
| *H04W 76/14* | (2018.01) |
| *H04W 16/28* | (2009.01) |
| *H04W 72/04* | (2009.01) |
| *H04W 76/11* | (2018.01) |
| *H04W 4/70* | (2018.01) |
| *H04W 74/08* | (2009.01) |

(52) U.S. Cl.
CPC ............ *H04W 76/14* (2018.02); *H04W 4/70* (2018.02); *H04W 16/28* (2013.01);
(Continued)

(58) Field of Classification Search
CPC . H04W 76/14; H04W 16/28; H04W 72/0493; H04W 76/11; H04W 4/70;
(Continued)

(56) References Cited

U.S. PATENT DOCUMENTS

2015/0049732 A1* 2/2015 Xue .................... H04W 72/042
                                                370/330
2016/0021549 A1* 1/2016 Subramanian ....... H04B 7/0617
                                                370/329
(Continued)

FOREIGN PATENT DOCUMENTS

GB          2545424 A      6/2017

OTHER PUBLICATIONS

Huawei, et al., "Beamforming for V2X Sidelink for FR1 and FR2", 3GPP Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600771, 4 Pages, Retrieved from the Internet: URL: http://www.3gpp.org/ftp/tsg%5Fran/WG1%5FRL1/TSGR1%5F96/Docs/R1%2D1903075%2Ezip [retrieved on Feb. 15, 2019] p. 1, line 1—p. 3, line 13.
(Continued)

*Primary Examiner* — Thai Nguyen
(74) *Attorney, Agent, or Firm* — Holland & Hart LLP (57) ABSTRACT

Systems and methods establishing and maintain a direct User Equipment to User Equipment communication link in a gNB are disclosed. A gNB may determine that direct UE to UE link should be established in a cell. The gNB may transmit information to a first and second UE to enable a device to device beam search procedure. The first and second UE may perform the beam search and report the result to the gNB. The gNB may determine the appropriate beam for the first and second UE to establish a communication link.

27 Claims, 7 Drawing Sheets

(52) U.S. Cl.
CPC ... *H04W 72/0493* (2013.01); *H04W 74/0833* (2013.01); *H04W 76/11* (2018.02)

(58) Field of Classification Search
CPC .......... H04W 74/0833; H04W 72/042; H04W 16/14; H04W 76/18; H04W 76/23; H04B 7/0617
See application file for complete search history.

(56) References Cited

U.S. PATENT DOCUMENTS

| | | | |
|---|---|---|---|
| 2017/0171690 A1* | 6/2017 | Kim | H04L 51/02 |
| 2018/0219604 A1* | 8/2018 | Lu | H04B 7/0695 |
| 2021/0058914 A1* | 2/2021 | Chae | H04W 16/28 |

OTHER PUBLICATIONS

International Search Report and Written Opinion—PCT/US2020/028913—ISA/EPO—dated Jul. 28, 2020.

Kyocera: "Physical Layer Procedures for CSI Acquisition in Unicast Transmissions," 3GPP Draft, 3GPP TSG-RAN WG1#96bis, R1-1904822, 3rd Generation Partnership Project (3GPP), Mobile Competence Centre, 650, Route Des Lucioles, F-06921, Sophia-Antipolis Cedex, France, vol. RAN WG1, No. Xi 'an, China; Apr. 8, 2019-Apr. 12, 2019, Apr. 7, 2019 (Apr. 7, 2019), XP051699974, 2 pages, Retrieved from the Internet:URL: http://www.3gpp.org/ftp/Meetings%5F3GPP%5FSYNC/RAN1/Docs/R1%2D1904822%2Ezip [retrieved on Apr. 7, 2019], the whole document.

* cited by examiner

GNB COORDINATED DEVICE TO DEVICE COMMUNICATION

CLAIM OF PRIORITY UNDER 35 U.S.C. § 119

This application claims the benefit of U.S. Provisional Application Ser. No. 62/837,472 entitled "GNB Coordinated Device to Device communication" filed on Apr. 23, 2019 which is expressly incorporated by reference herein in its entirety.

BACKGROUND

The following relates generally to wireless communication, and more specifically to device to device communication in a gNB cell.

Wireless communications systems are widely deployed to provide various types of communication content such as voice, video, packet data, messaging, broadcast, and so on. These systems may support communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., Long Term Evolution (LTE) system, or a New Radio (NR) system). A wireless multiple-access communications system may include base stations (e.g., a gNB or eNB) or other access network nodes, each simultaneously supporting communication for multiple communication devices, which may be otherwise known as user equipment (UE).

In some wireless systems, base stations and UEs may communicate using directional millimeter wave transmissions (e.g., beams), where beamforming techniques may be applied using one or more antenna arrays or panels to generate beams in different directions. Directional millimeter wave transmissions are expected to be utilized by many 5G compliant devices such as UEs. In many instances, it may be desirable for UEs and other devices in a gNB cell to establish a direct device to device communication link. Establishing and maintaining a directional device to device communication link may be difficult in a changing environment. UEs move and rotate and channel characteristics change. Directional transmission beam properties such as transmit beam power and beam width may also change over time. Moreover, the communication link may interfere with other communication links.

Accordingly, there is a need for systems and methods for establishing, coordinating and maintaining direct UE to UE communication links in cells. The following disclosure addresses this need.

SUMMARY

In one or more aspects, a gNB determines that there should be a direct device to device communication link between a first UE and a second UE. The gNB may transmit information to the first and second UE that will allow the first and second UE to perform a beam search within the gNB cell. The first and second UE may then perform a beam search and report the results to the gNB. The gNB may then determine which beams the first and second UE should use to transmit and receive on to establish a direct device to device communication link.

In another exemplary aspect a method of operating a gNB is disclosed. The gNB may determine that a direct link between a first User Equipment (UE) and a second UE should be established and transmit information to the first UE and the second UE to enable a beam search procedure between the first UE and the second UE.

In another exemplary aspect a method of operating a User Equipment (UE) is disclosed. The UE may receive information from a gNB indicating that the UE should begin a beam search procedure and transmit or receive a UE to UE beam search signal.

In a further exemplary aspect, a gNB is disclosed. The gNB may have a processor adapted to determine that a direct link between a first User Equipment (UE) and a second UE should be established and a transmitter adapted to transmit information to the first UE and the second UE to enable a beam search procedure between the first UE and the second UE.

In a further exemplary aspect, a UE is disclosed. The UE may have a receiver adapted to receive information from a gNB indicating that the UE should begin a beam search procedure; and a transmitter adapted to transmit or receive a UE to UE beam search signal.

In yet another exemplary aspect, a gNB is disclosed. The gNB may have a means for determining that a direct link between a first User Equipment (UE) and a second UE should be established and means for transmitting information to the first UE and the second UE to enable a beam search procedure between the first UE and the second UE.

In yet another exemplary aspect, a UE is disclosed. The UE may have a receiver means for receiving information from a gNB indicating that the UE should begin a beam search procedure; and means for transmitting or receiving a UE to UE beam search signal.

In an alternate exemplary aspect, computer readable medium is disclosed. The computer readable medium may have instructions for determining that a direct link between a first User Equipment (UE) and a second UE should be established and instructions for transmitting information to the first UE and the second UE to enable a beam search procedure between the first UE and the second UE.

In an alternate exemplary aspect, computer readable medium is disclosed. The computer readable medium may have instructions for receiving information from a gNB indicating that the UE should begin a beam search procedure; and instructions for transmitting or receiving a UE to UE beam search signal.

DETAILED DESCRIPTION

Figure 1:
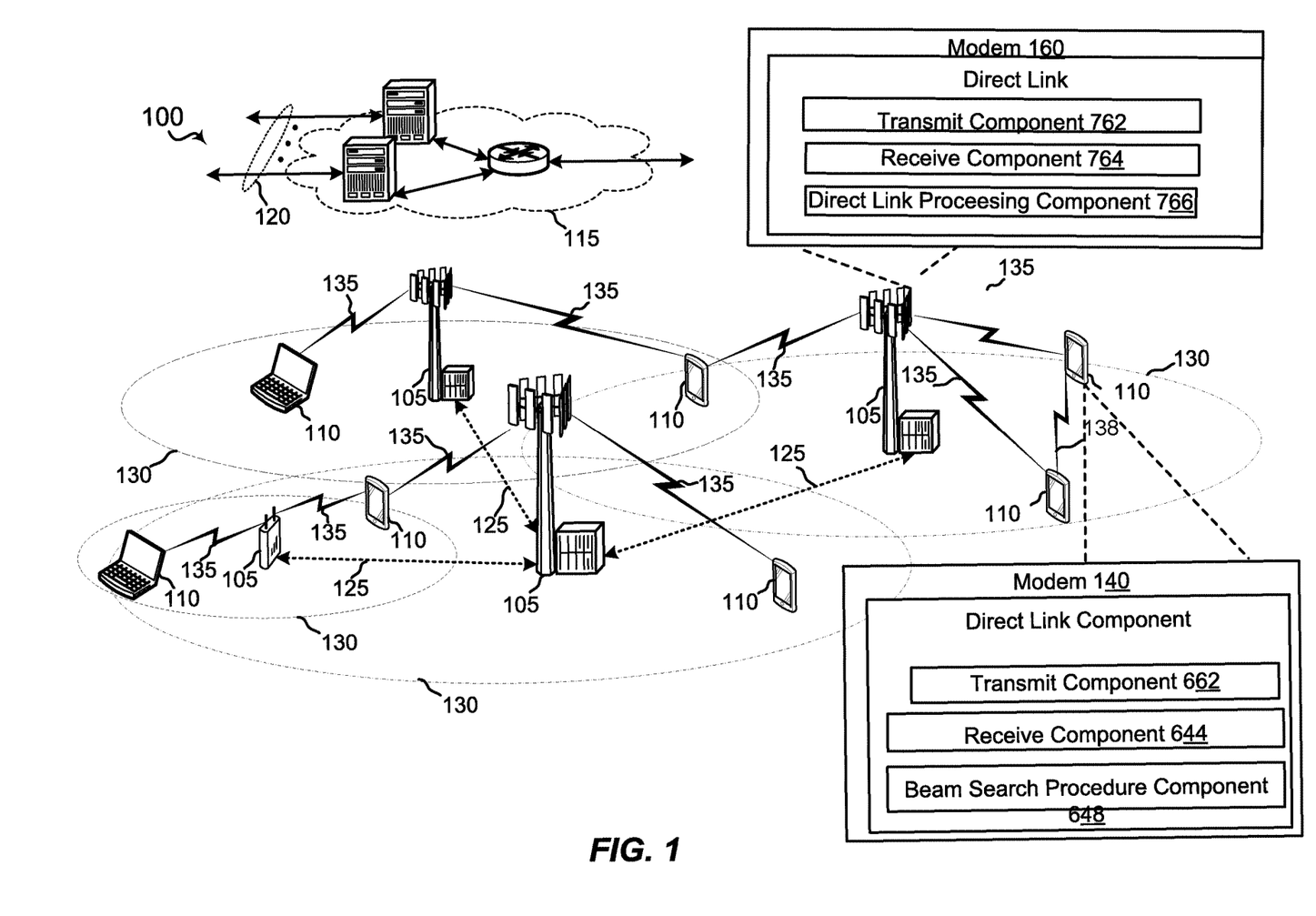
FIG. 1 illustrates an example of a system for wireless communication that supports direct UE to UE communication in accordance with aspects of the present disclosure.

FIG. 1 illustrates an example of a wireless communications system 100 in accordance with various aspects of the present disclosure. The wireless communications system 100 includes base stations 105, UEs 110, and a core network 115. In some examples, the wireless communications system 100 may be a Long-Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of a difference in transmit and receive array gains for the calculation of an uplink transmit power.

Base stations 105 may wirelessly communicate with UEs 110 via one or more base station antennas. Each base station 105 may provide communication coverage for a respective geographic coverage area 130. Communication links 135 shown in wireless communications system 100 may include uplink transmissions from a UE 110 to a base station 105, or downlink transmissions, from a base station 105 to a UE 110. Other communication links such as device to device communication link 138 may be a direct UE 110 to UE 110 link. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 110 may be dispersed throughout the wireless communications system 100, and each UE 110 may be stationary or mobile. A UE 110 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 110 may also be able to communicate directly with other UEs (e.g., using a peer-to-peer (P2P) or device-to-device (D2D) protocol). One or more of a group of UEs 110 utilizing D2D communications may be within the coverage area 130 of a cell. Other UEs 110 in such a group may be outside the coverage area 130 of a cell, or otherwise unable to receive transmissions from a base station 105. In some cases, groups of UEs 110 communicating via D2D communications may utilize a one-to-many (1:M) system in which each UE 110 transmits to every other UE 110 in the group. In some cases, a base station 105 facilitates the scheduling of resources for D2D communications. In other cases, D2D communications are carried out independent of a base station 105.

Some UEs 110, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 110 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 115 and with one another. For example, base stations 105 may interface with the core network 115 through backhaul links (e.g., 51, etc.). Base stations 105 may communicate with one another over backhaul links 134 (e.g., X2, etc.) either directly or indirectly (e.g., through core network 115). Backhaul links may be wired or unwired. Base stations 105 may perform radio configuration and scheduling for communication with UEs 110 or may operate under the control of a base station controller (not shown). In some examples, base stations 105 may be macro cells, small cells, hot spots, or the like. Base stations 105 may also be referred to as gNBs.

A base station 105 may be connected by an Si interface to the core network 115. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 110 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 120 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 110 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 110 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 110 (e.g., for directional beamforming). However, EHF transmissions may be subject to even greater atmospheric attenuation and shorter range than UHF transmissions.

Wireless communications system 100 may support mmW communications between UEs 110 and base stations 105 and in backhaul links. Devices operating in mmW or EHF bands may have multiple antennas to allow beamforming. That is, a base station 105 may use multiple antennas or antenna arrays to conduct beamforming operations for directional communications with a UE 110. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 110). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 110), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 110. Signals may be transmitted multiple times in different directions (e.g., each transmission may be beamformed differently). A mmW receiver (e.g., a UE 110) may try multiple beams (e.g., antenna subarrays) while receiving the synchronization signals.

In some cases, the antennas of a base station 105 or UE 110 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 110.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 110 and a network device or core network 120 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 110 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 110 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 110 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 110 attempting to access a wireless network may perform an initial cell search by detecting a primary synchronization signal (PSS) from a base station 105. The PSS may enable synchronization of slot timing and may indicate a physical layer identity value. The UE 110 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 110 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 110 may receive one or more system information blocks (SIBs). For example, SIB1 may contain cell access parameters and scheduling information for other SIBs. For instance, SIB1 access information, including cell identity information, and it may indicate whether a UE 110 is allowed to camp on a coverage area 130. SIB1 also includes cell selection information (or cell selection parameters) and scheduling information for other SIBs, such as SIB2. Decoding SIB1 may enable the UE 110 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 110 decodes SIB2, it may transmit a RACH preamble to a base station 105. For example, the RACH preamble may be randomly selected from a set of 64 predetermined sequences. This may enable the base station 105 to distinguish between multiple UEs 110 trying to access the system simultaneously. The base station 105 may respond with a random access response that provides an uplink resource grant, a timing advance, and a temporary cell radio network temporary identifier (C-RNTI). The UE 110 may then transmit an RRC connection request along with a temporary mobile subscriber identity (TMSI) (e.g., if the UE 110 has previously been connected to the same wireless network) or a random identifier. The RRC connection request may also indicate the reason the UE 110 is connecting to the network (e.g., emergency, signaling, data exchange, etc.). The base station 105 may respond to the connection request with a contention resolution message addressed to the UE 110, which may provide a new C-RNTI. If the UE 110 receives a contention resolution message with the correct identification, it may proceed with RRC setup. If the UE 110 does not receive a contention resolution message (e.g., if there is a conflict with another UE 110), the UE 110 may repeat the RACH process by transmitting a new RACH preamble.

Wireless devices in wireless communications system 100 may send transmissions in accordance with a certain link budget. The link budget may account for allowed signal attenuation between a UE 110 and a base station 105, as well as antenna gains at the UE 110 and base station 105. Accordingly, the link budget may provide, for example, a maximum transmit power for the various wireless devices within wireless communications system 100. In some cases, a UE 110 may coordinate transmit power with a serving base station 105 to mitigate interference, improve the uplink data rate, and prolong battery life.

FIG. 1 illustrates an example of a system for wireless communication that supports gNB coordinated UE to UE direct links in accordance with aspects of the present disclosure. Some of the communication devices in wireless communication system 100 may have modems that include a direct link component. For example, a base station 105 may have a base station modem 160 having a direct link component. In some aspect the direct link component may reside outside the modem. The direct link component may have a transmit component 762 for transmitting directional beams. The direct link component may also have a receive component 764 for receiving directional beams. The direct link component may have a direct link processing component 766 that may support establishment and maintenance of a direct link between two UEs. The direct link processing component may be adapted to determine if a direct link should be established and to determine the beam pairs that should be used by the UEs.

A UE 110 may have a UE modem 140 featuring a direct link component. In some aspects, the direct link component may reside outside the modem. The direct link component may have a transmit component 642 for transmitting directional beams. The direct link component may also have a receive component 644 for receiving one or more directional beams. The direct link component may also have a beam search procedure component 646 for executing beam search procedures. The beam search procedure component 646 may be adapted to executing a beam search procedure in cooperation with another UE.

Figure 2:
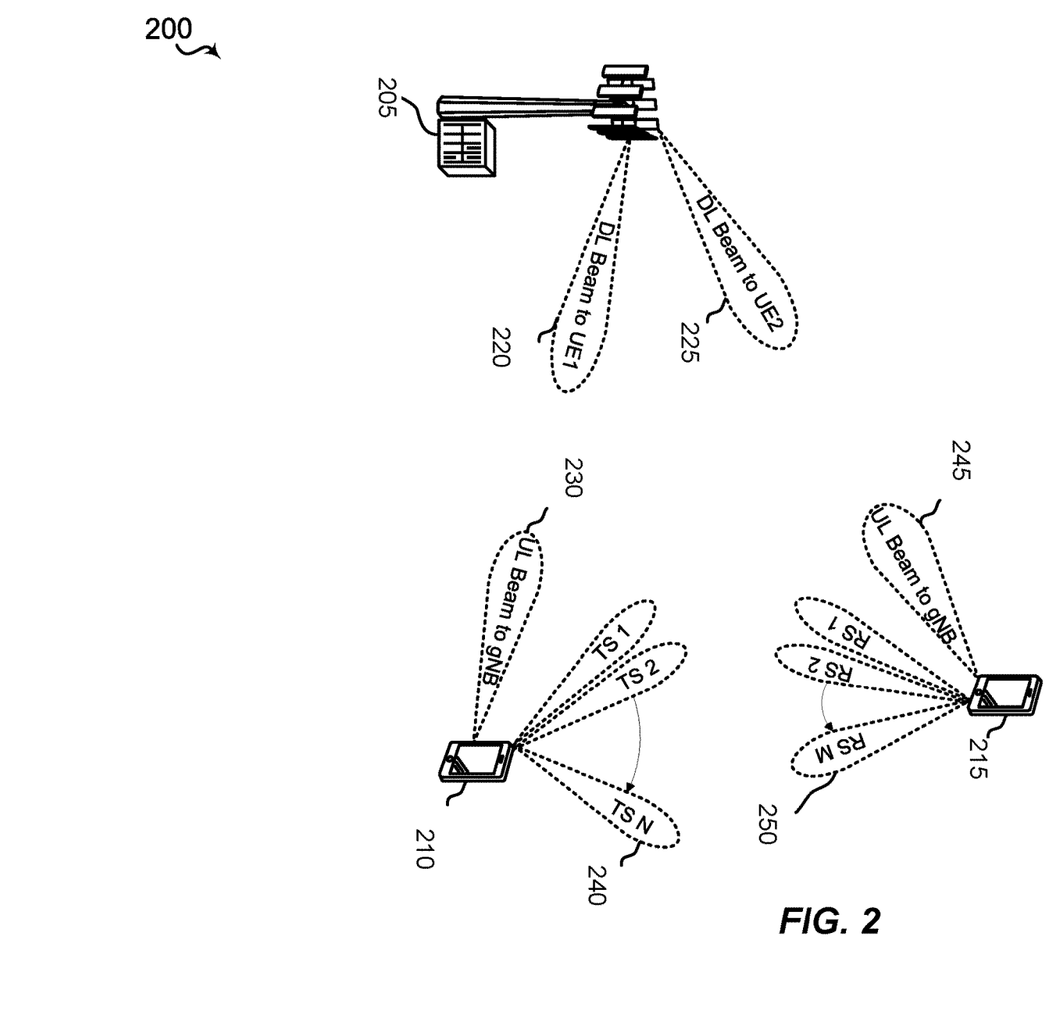
FIG. 2 illustrates an example of a gNB coordinating a UE to UE beam search in accordance with aspects of the present disclosure.

FIG. 2 illustrates an example of a gNB coordinating a UE to UE beam search 200 in accordance with aspects of the present disclosure. Shown in FIG. 2 is a gNB 205 like many of the base stations 105 shown in FIG. 1. Also shown are a first UE 210 and a second UE 215 much like the UE shown in FIG. 1. gNB 205 has a Downlink (DL) Beam 220 to the first UE 210 and a DL Beam 225 to the second UE 215. The first UE 210 has an Uplink (UL) beam 230 to gNB 205 and has N Transmit Search (TS) beams 240. The second UE 215 has M Receive Search (RS) beams 250.

In one aspect, gNB 205 may be in active communication with the first UE 210 and the second UE 215. At some point, gNB 205, the first UE 210, or the second UE 215 may determine that it would be beneficial to have a direct communication link between the first UE 210 and the second UE 215. The first UE 210 or the second UE 215, or both may request a UE-to-UE beam search by sending a search request to the gNB 205. The gNB 205 may also initiate a UE-to-UE beam search without a request from either the first UE 210 or the second UE 215.

The gNB 205 may allocate resources for the beam search. The resources may be for example RACH slots, Physical Downlink Shared Channel (PDSCH) resources or Physical Uplink Shared Channel (PUSCH) resources, or any other suitable resources for a beam search. The gNB 205 may also determine the number and ID of TS beams 240 and the number and ID of RS beams 215. The gNB 205 may also determine the number and ID of the MIMO transmit panels for the first UE 210 and the number and ID of the receive panels for the second UE 215. The gNB 205 may then inform the first UE 210 and the second UE 215 of the parameters to be used in the beam search.

Those skilled in the art will recognize there are many suitable beam search algorithms. In one aspect, the first UE 210 will transmit on a first TS beam while the second UE 215 scans through MRS beams 250. Then the first UE 210 will transmit on a second TS beam while the second UE 215 scans through M RS beams 250. The first UE 210 and the second UE 215 may repeat until the first UE has transmitted on all N TS beams 240. The second UE 215 may record the Reference Signal Receive Power (RSRP), Signal to Interference Noise Ratio (SINR), the Signal to Noise Ratio (SNR), Interference Measurement Resource (IMR) or other indicia of the radio link robustness.

The gNB 205 may request the results of the beam search from the second UE 215 or the second UE 215 may send the results to the base station 205 without a request. The results may contain beam pair IDs, beam IDs, preferred beams, RSRP, SINR, SNR and\or IMR. The gNB may decide the appropriate beam pair for a direct link between the first UE 210 and the second UE 215. The gNB 205 may select a beam pair that may not provide the most robust link between the first UE 210 and 215. Other considerations such as interference with other cell links may be considered in choosing the beam pair.

The gNB 205 may transmit messages to the UEs 210, 215 containing information on which beams to use for a direct link, rank, the modulation and coding scheme to use, the channel quality index, transmit power and/or other direct link parameters. The gNB 205 may also indicate that a direct link at this time is not possible. The gNB 205 may allocate future resources for beam searching periodically, aperiodically or semi-persistently. The assignment of reduced resources for reduced beam search or refinement is also contemplated.

During operation it may become apparent the direct link may be causing interference with other direct links or with other gNB to UE links. At that time, the gNB 205 may schedule another UE to UE beam search. Also, during operation, the SNR, SINR, RSRP or other indicia of link strength may degrade, or the link may completely fail. In that case, the first UE 210 or the second UE 215 may inform the gNB 205 and the gNB may schedule another beam search.

Figure 3:
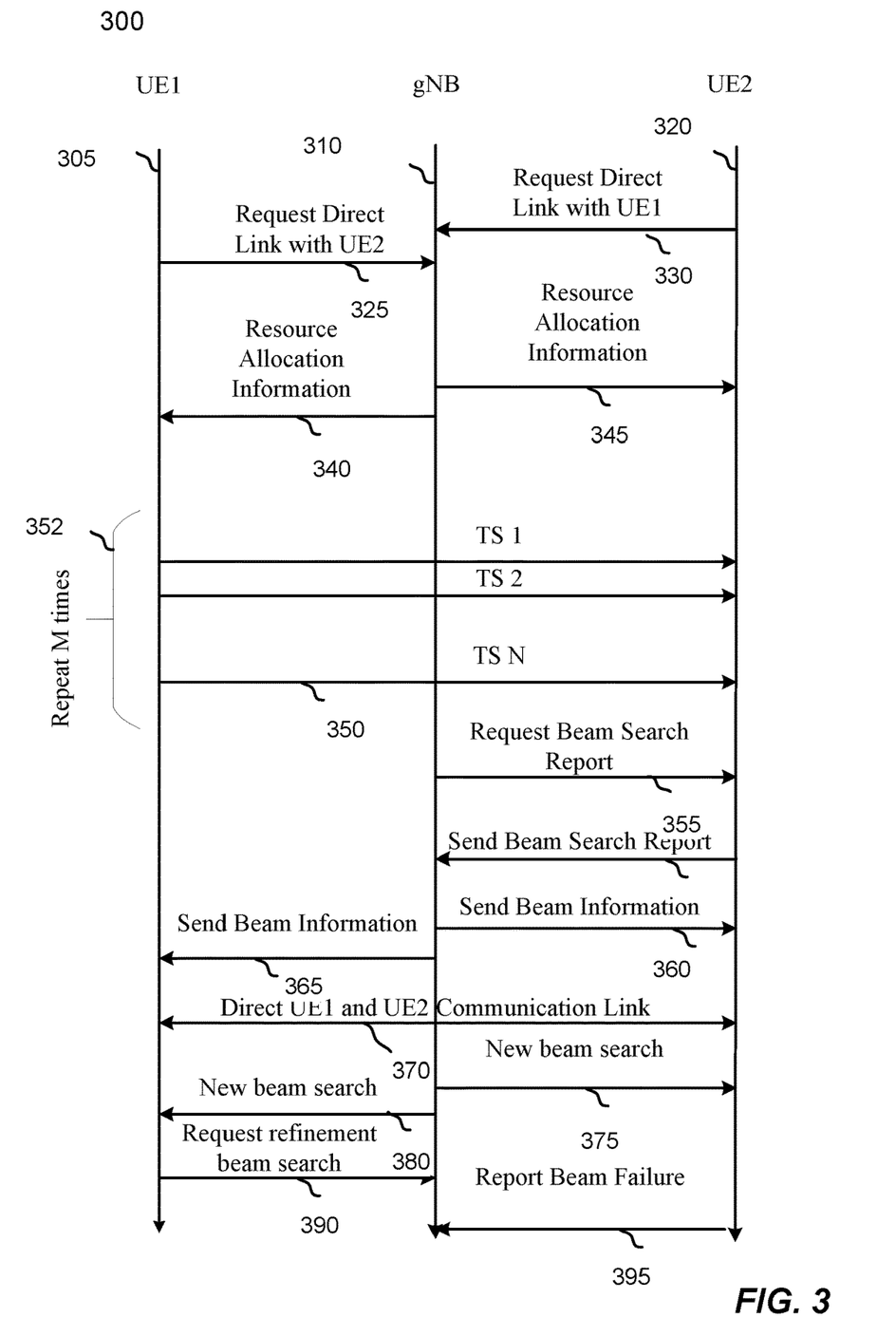
FIG. 3 illustrates an example of a timeline showing a gNB coordinating the establishment and maintenance of a UE to UE communication link in accordance with aspects of the present disclosure.

FIG. 3 illustrates an example of a timeline showing a gNB coordinating the establishment and maintenance of a UE to UE communication link 300 in accordance with aspects of the present disclosure. Shown in FIG. 3 is an exemplary timeline associated with a first UE 305, a second UE 320 and a gNB 310. The first UE 310 and the second UE 320 may be like some of the UEs shown in FIG. 1. The gNB 310 may be like some of the base stations 105 shown in FIG. 1.

The second UE 320 may send a request for a direct link with the first UE 320. The UE 320 may send the request when it believes that it is near another UE. UE 320 may for example monitor other UEs transmissions to determine proximity. Similarly, the first UE may also send a request for a direct link the second UE 325. The gNB 310 may receive one or both direct link requests or the gNB 310 may determine on its own that a direct link should be established. If the gNB 310 determines that a direct link may be established, it may assign resource for a beam search. The gNB 310 may transmit the resource allocation information 345 to the second UE 320 and may also transmit the resource allocation information 340 to the first UE 305. The resources allocation information may be for example information about which RACH resources, PDSCH resources or a PUSCH resources to use for beam search.

The gNB 310 may also transmit the first UE and the second UE assignments for the beam search, such as which UE is the transmit UE and which UE is the receive UE. In this example, the first UE 305 is the transmitter and the second UE 320 is the receiver. The first UE 305 may transmit N TS beams 350 while the second UE 320 receives on the first of M receive beams. The first UE 305 may then transmit N TS beams 350 while the second UE 320 receives on the second of M receive beams. The first UE 305 may repeat this process M times 352 allowing the second UE 320 to receive all N TS beams on all M receive beams.

The gNB 310 may then request a beam search report 355. The UE may then send a beam search report 355. (In some aspects, the second UE 320 will send a beam search report without receiving a request). The beam search report may include for example beam IDs, RSRP of the beam pairs, SINR, SNR IMR, preferred beam ID, preferred beam pairs, MIMO panel IDs or any other information related to the beam search. The gNB 310 may then send beam information 360 to the second UE 320 and send beam information 365 to the first UE 305. The beam information may include beam ID, MIMO panel ID, periodic beam search assignments, aperiodic beam search assignments, semi-persistent scheduling information or any other link establishment and/or maintenance information. With the beam information the first UE 305 and the second UE 320 may establish a direct link communication link 370.

The gNB 310 may at any time send the second UE 320 a new beam search 375 command. The gNB 310 may also send the first UE 305 a new beach search 380 command. This may be predicated on a number or conditions including the direct link between the first UE 305 and the second UE 320 causing interference with other links.

At some point, one of the UEs may determine to refine its transmit and/or receive beams. In this example, the first UE 305 requests a refinement beam search 390. In some aspects the refinement beam search is similar to a normal beam search but with reduced resources. Finally, at some point the direct link may fail and one or both UEs may report a link failure to the gNB 310. In this example the second UE 320 reports beam failure 395. The gNB 310 in turn may decide to assign resources for another beam search.

Figure 4:
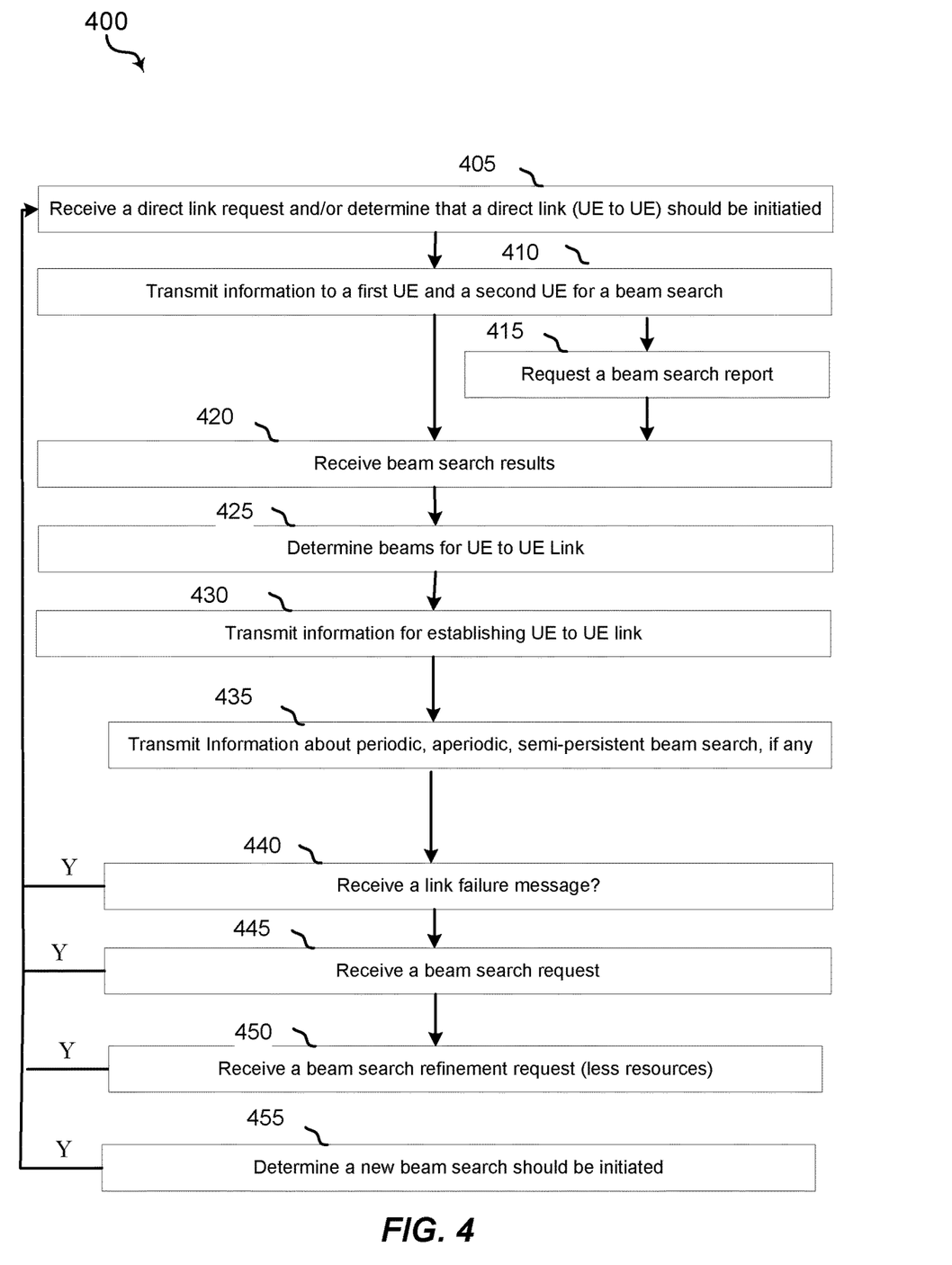
FIG. 4 is an exemplary flow diagram for a gNB coordinating the establishment and maintenance of a UE to UE communication link in accordance with aspects of the present disclosure.

FIG. 4 is an exemplary flow diagram for a gNB coordinating the establishment and maintenance of a UE to UE communication link 400 in accordance with aspects of the present disclosure. The flow diagram may be an example of a UE flow that complements with the timing diagram in FIG. 3. The gNB may be for example one of the base stations 105 in FIG. 1. The gNB may receive a direct link request and/or determine that a direct link (UE to UE) should be initiated 405. The gNB may assign resources for doing a beam search. The resources may be for example RACH slots resources, PDSCH resources or PUSCH resources. The gNB may also determine the number and ID of transmit and receive beams to search or the number or ID of transmit and receive panels to use during the search. The gNB may determine which UE will be the transmitter and which UE will be the receiver during the beam search.

The gNB may then transmit the information to the first UE and second UE for a beam search 410. In some aspects, the gNB may request a beam search report 415. In other aspects, the UE may send the beam search report without the gNB requesting a search report. Either way the gNB will receive beam search results 420. The report may contain beam pair IDs, beam IDs, RSRP of the beam pairs, SINR, SNR IMR, preferred beam ID, preferred beam pairs, MIMO panel IDs or any other information related to the beam search.

The gNB may determine the beams to be used for the UE to UE communication link 425. The determination may be made using the information provided in the beam search results and/or considerations about link to link interference and other cell traffic management considerations. The gNB may then transmit information for establishing the direct UE to UE link 430. The information may include rank, modulation and coding scheme, channel quality index, transmit power or other communication link parameters. The gNB may schedule periodic, aperiodic or semi-persistent beam search 435.

Figure 5:
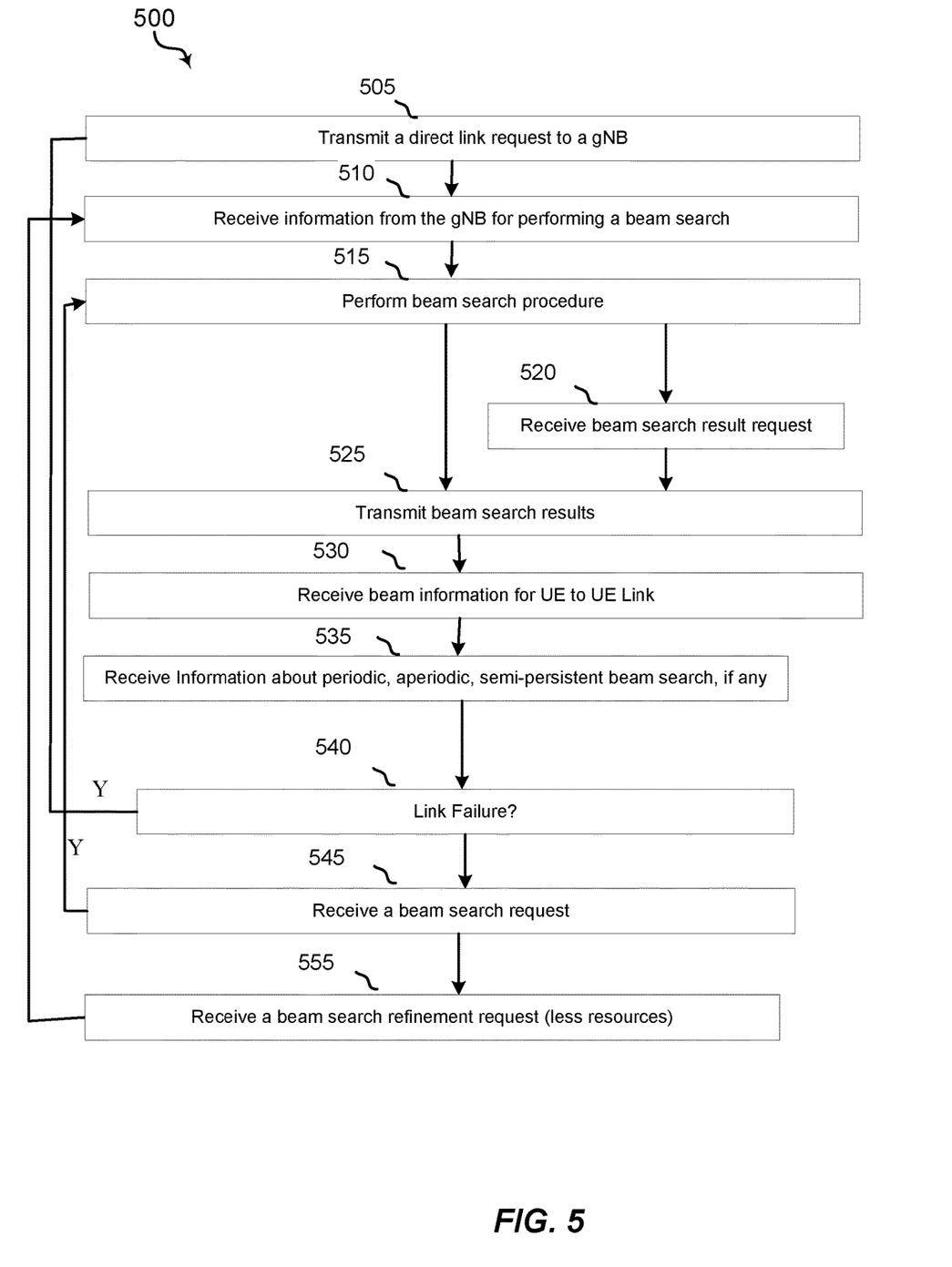
FIG. 5 is an exemplary flow diagram for a UE establishing a UE to UE communication link in accordance with aspects of the present disclosure.

At some point, the gNB may receive a link failure message 440. The gNB may then determine if another direct link should be established. The gNB may also receive a beam search request 445. The gNB may then determine if another direct link should be established. These events may occur because of a link failure or because the SNR, SINR, RSRP or other link quality indicia falls below a predetermined level. The gNB may also receive search refinement request 450. The gNB may then determine if a beam search with reduced resources should be initiated. The gNB may also determine if a new beam search should be initiated 455. This may occur because for example the direct link is interfering with other links, FIG. 5 is an exemplary flow diagram for a UE establishing a UE to UE communication link 500 in accordance with aspects of the present disclosure. The flow diagram may be a complementary flow diagram for one of the UEs depicted in FIG. 3. The flow diagram may also be a flow diagram that may be used in conjunction with the gNB flow shown in FIG. 4. A UE may transmit a direct link request to a gNB 505. The UE may receive information from the gNb for performing the search 510. The information may include for example, whether the UE should transmit or receive during the search. The information may also include the beams to use during the search, the MIMO panel IDs, or other search related information.

The UE may then perform the beam procedure 515. In some aspect the UE may receive a beam search result request 520 from the gNB. In other aspects, the UE will transmit the beam search results without a request. Either way, the UE may transmit the beam search results 525 to the gNB. The UE may then receive beam information for the UE to UE link 530. The information may include rank, modulation and coding scheme, channel quality index, transmit power or other communication link parameters. The UE may also receive information about periodic, aperiodic, semi-persistent beam search 535.

At some point the UE may experience a link failure 540 and may send a new request for a beam search. The UE may also receive a beam search request 545 and may then begin a new beam search. The UE may also receive a beam search refinement request 555. The request may be the assignment of beam search resources but less resources than for a new search.

Figure 6:
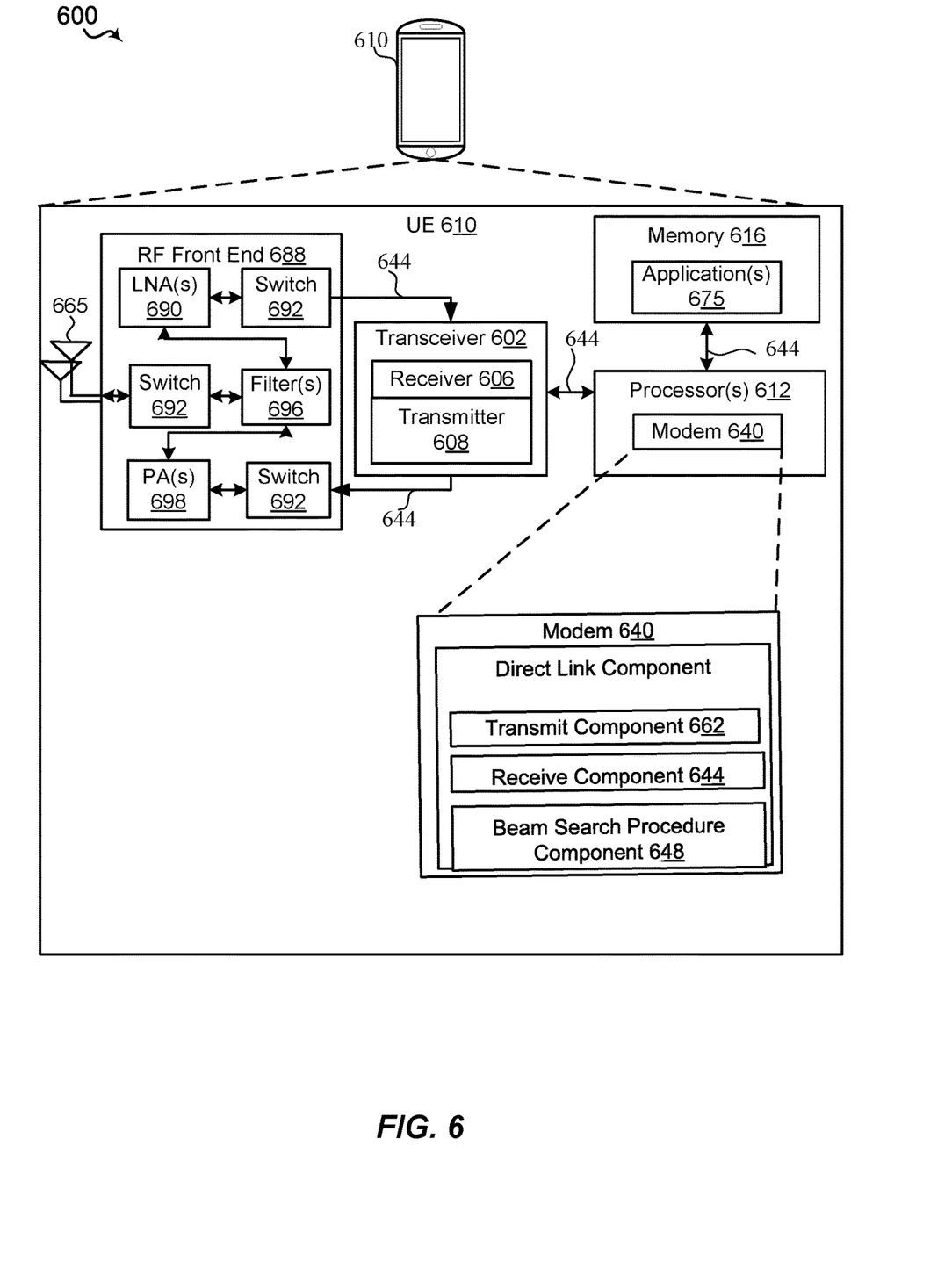
FIG. 6 is an exemplary illustration of a UE in accordance with aspects of the present disclosure.

Referring to FIG. 6, in accordance with various aspects of the present disclosure an example of an implementation of UE 610 is shown 600. UE 610 may be one of the UEs 110 depicted in FIG. 1 for example. The UE 610 may also implement the flow shown in FIG. 5 for example. The UE 610 may also be used according to the timing diagram shown in FIG. 3. It may include a variety of components, some of which have already been described above, but including components such as one or more processors 612 and memory 616 and transceiver 602 in communication via one or more buses 644, which may operate in conjunction with modem 640 and direct link component to enable one or more of the functions described herein related to establishing a direct UE-UE link. Further, the one or more processors 612, modem 640, memory 616, transceiver 602, RF front end 688 and one or more antennas 665, may be configured to support voice and/or data calls (simultaneously or non-simultaneously) in one or more radio access technologies as well as radar.

In an aspect, the one or more processors 612 can include a modem 640 that uses one or more modem processors. The various functions related to a radar component may be included in modem 640 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 640 associated with the direct link component may be performed by transceiver 602.

Also, memory 616 may be configured to store data used herein and/or local versions of applications 675 or modem 640 and/or one or more of its subcomponents being executed by at least one processor 612. Memory 616 can include any type of computer-readable medium usable by a computer or at least one processor 612, such as random-access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining radar component and/or one or more of its subcomponents, and/or data associated therewith, when UE 610 is operating at least one processor 612.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE may include RF front end 688, which may operate in communication with one or more antennas 665 and transceiver 602 for receiving and transmitting radio transmissions, for example, wireless communications transmitted by at least one base station or wireless transmissions transmitted by UE. RF front end 688 may be connected to one or more antennas 665 and can include one or more low-noise amplifiers (LNAs) 690, one or more switches 692, one or more power amplifiers (PAs) 898, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 892 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE can communicate with, for example, one or more base stations or one or more cells associated with one or more base stations. In an aspect, for example, modem 640 can configure transceiver 602 to operate at a specified frequency and power level based on the UE configuration of the and the communication protocol used by modem 640.

In an aspect, modem 640 can be a multiband-multimode modem, which can process digital data and communicate with transceiver 602 such that the digital data is sent and received using transceiver 602. In an aspect, modem 640 can be multiband and be configured to support multiple frequency bands for a specific communications protocol. In an aspect, modem 640 can be multimode and be configured to support multiple operating networks and communications protocols. In an aspect, modem 640 can control one or more components of UE (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with as provided by the network during cell selection and/or cell reselection.

Figure 7:
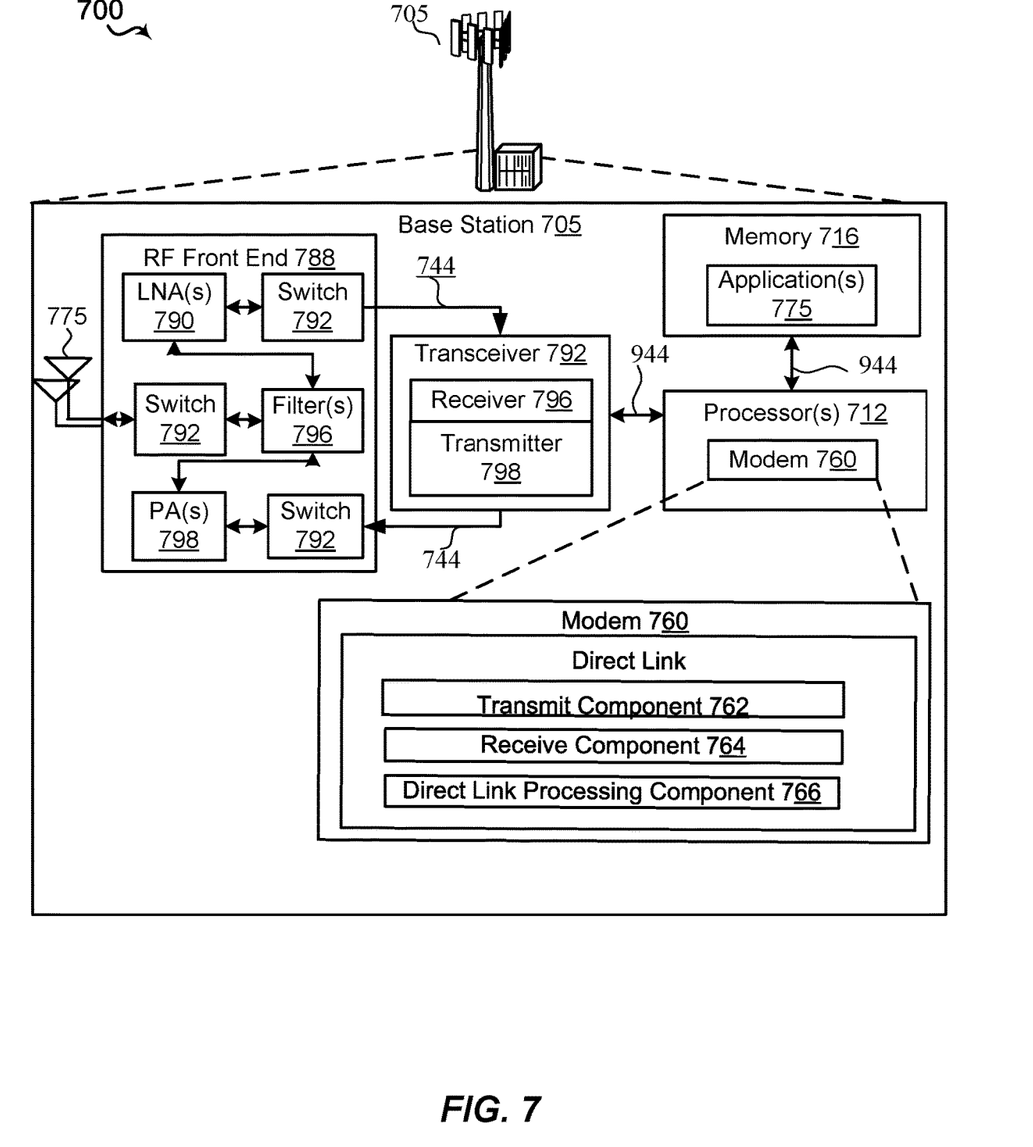
FIG. 7 is an exemplary illustration of a base station in accordance with aspects of the present disclosure.

Referring to FIG. 7, in accordance with various aspects of the present disclosure an example of an implementation of base station, such as one of the base stations shown in FIG. 1, that may include a variety of components, some of which have already been described above, but including components such as one or more processors 712 and memory 716 and transceiver 792 in communication via one or more buses 744, which may operate in conjunction with modem 760 and modem 760 to enable one or more of the functions described herein related to establishing and maintaining a direct UE to UE link.

The transceiver 792, receiver 796, transmitter 798, one or more processors 712, memory 716, applications 775, buses 774, RF front end 788, LNAs 790, switches 792, filters 796, PAs 798, and one or more antennas 775 may be the same as or similar to the corresponding components of UE, as described above, but configured or otherwise programmed for base station operations as opposed to UE operations.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method of wireless communications at a base station, comprising:
    determining that a direct link between a first User Equipment (UE) and a second UE should be established;
    transmitting information to the first UE and the second UE to enable a directional beam search procedure between the first UE and the second UE; and
    receiving a message from the first UE or the second UE that indicates a result of the directional beam search procedure, wherein the result comprises information associated with at least one of one or more directional transmit or receive beams of the first UE or the second UE used in the directional beam search procedure.

2. The method of claim 1, wherein the information transmitted to the first UE and the second UE indicates that the first UE is a beam search transmitter and the second UE is a beam search receiver.

3. The method of claim 2, wherein the information transmitted to the first and the second UE has resource allocation information.

4. The method of claim 3, wherein the resource allocation information includes a random access channel resource, a physical downlink shared channel resource, or a physical uplink shared channel resource.

5. The method of claim 1, wherein the information includes a number or ID of a transmit or receive beams to be used in the directional beam search procedure.

6. The method of claim 5, further comprising transmitting information to the first UE and the second UE about which beams to use for UE to UE communication.

7. The method of claim 1, further comprising transmitting information about a subsequent periodic or aperiodic or semi-persistent beam search.

8. The method of claim 1, further comprising receiving information from the first UE or the second UE that indicates a beam failure has occurred.

9. The method of claim 1, further comprising receiving a request from the first UE or the second UE for an additional directional beam search procedure.

10. An apparatus for wireless communications at a base station, comprising:
    a processor adapted to determine that a direct link between a first User Equipment (UE) and a second UE should be established;
    a transmitter adapted to transmit information to the first UE and the second UE to enable a directional beam search procedure between the first UE and the second UE; and
    a receiver adapted to receive a message from the first UE or the second UE that indicates a result of the directional beam search procedure, wherein the result comprises information associated with at least one of one or more directional transmit or receive beams of the first UE or the second UE used in the directional beam search procedure.

11. The apparatus of claim 10, wherein the information transmitted to the first UE and the second UE indicates that the first UE is a beam search transmitter and the second UE is a beam search receiver.

12. The apparatus of claim 11, wherein the information transmitted to the first and the second UE has resource allocation information.

13. The apparatus of claim 12, wherein the resource allocation information includes a random access channel resource, a physical downlink shared channel resource, or a physical uplink shared channel resource.

14. The apparatus of claim 10, wherein the information includes a number or ID of a transmit or receive beams to be used in the directional beam search procedure.

15. The apparatus of claim 14, wherein the transmitter is further adapted to transmit information to the first UE and the second UE about which beams to use for UE to UE communication.

16. The apparatus of claim 10, wherein the transmitter is further adapted to transmit information about a subsequent periodic or aperiodic or semi-persistent beam search.

17. The apparatus of claim 10, wherein the receiver is further adapted to receive information from the first UE or the second UE that indicates a beam failure has occurred.

18. The apparatus of claim 10, wherein the receiver is further adapted to receive a request from the first UE or the second UE for an additional directional beam search procedure.

19. An apparatus for wireless communications at a base station, comprising:
    means for determining that a direct link between a first User Equipment (UE) and a second UE should be established;
    means for transmitting information to the first UE and the second UE to enable a directional beam search procedure between the first UE and the second UE; and
    means for receiving a message from the first UE or the second UE that indicates a result of the directional beam search procedure, wherein the result comprises information associated with at least one of one or more directional transmit or receive beams of the first UE or the second UE used in the directional beam search procedure.

20. The apparatus of claim 19, wherein the information transmitted to the first UE and the second UE indicates that the first UE is a beam search transmitter and the second UE is a beam search receiver.

21. The apparatus of claim 20, wherein the information transmitted to the first and the second UE has resource allocation information.

22. The apparatus of claim 21, wherein the resource allocation information includes a random access channel resource, a physical downlink shared channel resource or a physical uplink shared channel resource.

23. The apparatus of claim 19, wherein the information includes a number or ID of a transmit or receive beams to be used in the directional beam search procedure.

24. The apparatus of claim 23, further comprising means for transmitting information to the first UE and the second UE about which beams to use for UE to UE communication.

25. The apparatus of claim 19, further comprising means for transmitting information about a subsequent periodic or aperiodic or semi-persistent beam search.

26. The apparatus of claim 19, further comprising means for receiving information from the first UE or the second UE that indicates a beam failure has occurred.

27. A non-transitory computer-readable medium storing code for wireless communications at a base station, the code comprising instructions executable by a processor to:
  determine that a direct link between a first User Equipment (UE) and a second UE should be established;
  transmit information to the first UE and the second UE to enable a directional beam search procedure between the first UE and the second UE; and
  receive a message from the first UE or the second UE that indicates a result of the directional beam search procedure, wherein the result comprises information associated with at least one of one or more directional transmit or receive beams of the first UE or the second UE used in the directional beam search procedure.

* * * * *